R. CHESNUT & J. F. PIEHL.
Churns.
No. 149,197. Patented March 31, 1874.
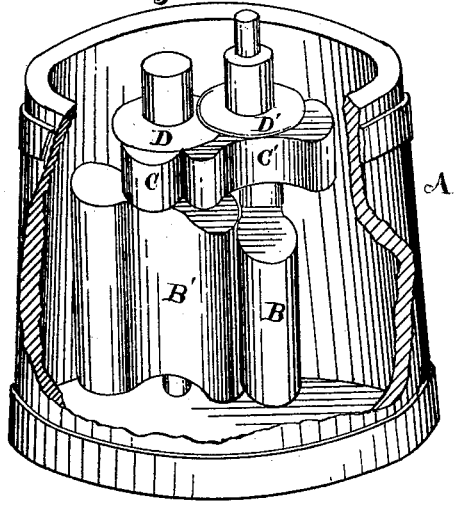
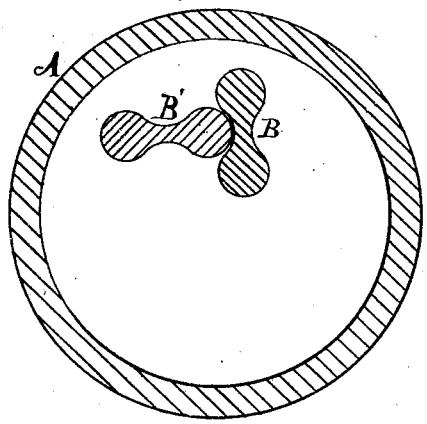
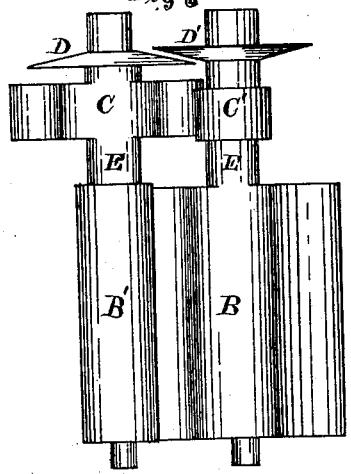
Witnesses
L. L. Aikins
H. P. Tenant
Inventors
Robert Chestnut
John F. Piehl
By J. B. Hunt & Co
Atty's

UNITED STATES PATENT OFFICE.

ROBERT CHESNUT AND JOHN F. PIEHL, OF RICHMOND, INDIANA.

IMPROVEMENT IN CHURNS.

Specification forming part of Letters Patent No. 149,197, dated March 31, 1874; application filed December 20, 1873.

*To all whom it may concern:*

Be it known that we, ROBERT CHESNUT and JOHN F. PIEHL, both of Richmond, in the county of Wayne and State of Indiana, have invented certain Improvements in Churns, of which the following is a specification:

The nature of our invention consists in the employment of a pair of interlocking revolving dashers, each of which consists of two connected cylinders, imperfect at their junction, and the revolving motion of which is preserved by two shorter cylinders of like form arranged transversely at the top of each dasher. Both dashers are arranged eccentrically on the same side of the churn-barrel. Thus constructed and arranged, the dashers act to break up the globules of the milk or cream, both by agitating it and by compressure upon it between them; and the recession of the cream from the dashers and banking up on the sides, caused by centrifugal action when the dashers are rotated at a high rate of speed, and which we found by actual experiment to be a serious obstacle to rapid churning when the dashers were placed on opposite sides of the barrel, is to a very great extent prevented.

In the annexed drawings, Figure 1 is a perspective view of the interlocking dashers and the barrel of the churn, of which the front part has been broken away to expose the dashers. Fig. 2 is a horizontal section. Fig. 3 is an elevation of the dashers, detached.

The same letters of reference are used in the several figures in the designation of identical parts.

The dashers are arranged on one side of the churn-barrel A, as best seen in Fig. 2, for the purpose above stated. Each dasher has two pairs of wings, respectively marked B and C' and B' and C. The double-leafed wings B and B' occupy the main length of the dasher rods or spindles E, and stand at right angles to the short double-leafed wings C and C', which are arranged above them. By this manner of construction the dashers will properly remain interlocked and rotate in unison when power is applied to either one of them; but the respective wings have also a clear sweep, and will, when operated, cause a proper agitation of the cream. In this respect they are clearly distinguishable from the well-known so-called cogged dashers, which, when rotated, do not properly agitate the cream, for the reason that the leaves or cogs being comparatively close together, they will approximately act like solid cylinders, so far as the mere agitation of the cream is concerned. Overhanging disks D and D' are placed on the dasher-spindles above the upper pairs of wings, to prevent the upward splashing of the cream.

What we claim as our invention, and desire to secure by Letters Patent, is—

Two interlocking dashers, each consisting of two connected cylinders, imperfect at their junction, which dashers mesh together in operation, and two shorter cylinders of like form, placed transversely at the top, serving to preserve a uniform movement, the whole arranged eccentrically on the same side of the center of the churn-barrel, substantially as and for the purpose shown and described.

ROBERT CHESNUT.
JOHN F. PIEHL.

Witnesses:
H. DILLE,
CALEB ELLIOTT.